P. H. DASEN.
CLUTCH CONTROL LOCK.
APPLICATION FILED APR. 13, 1921.
1,420,821.
Patented June 27, 1922.
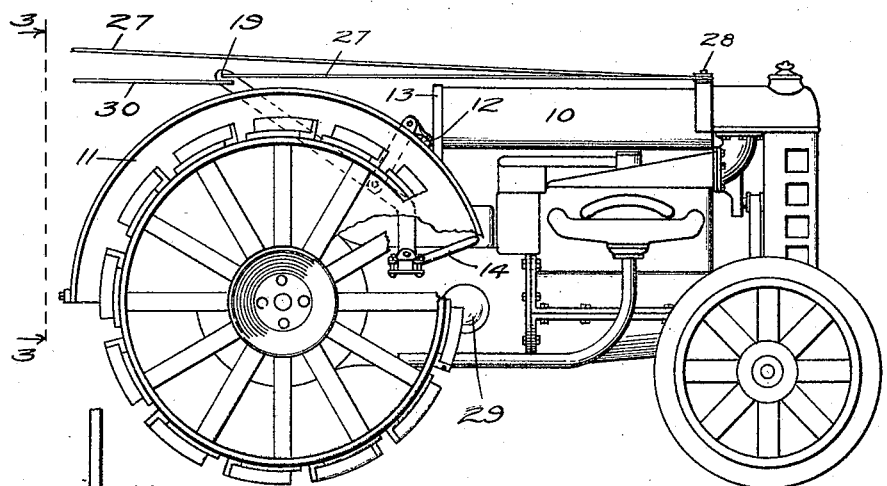
Fig. 1
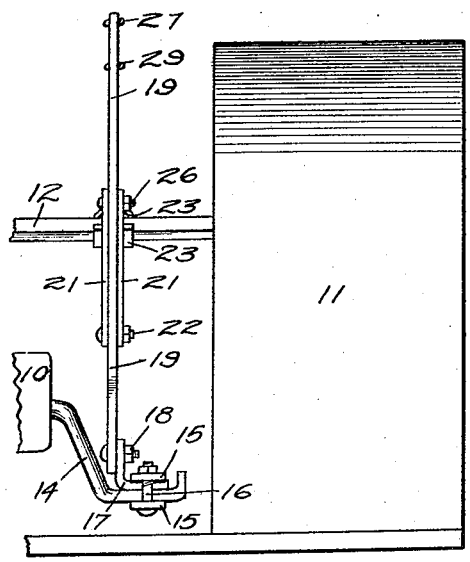
Fig. 3
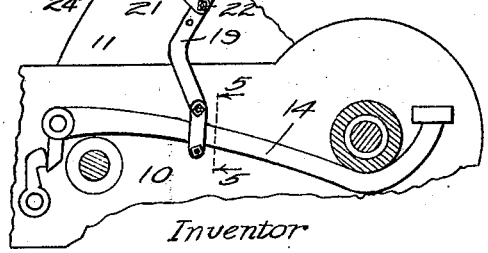
Inventor
Paul H. Dasen
By Bair & Freeman
Attorneys
Witness
Lynn Latta

UNITED STATES PATENT OFFICE.

PAUL H. DASEN, OF OTTOSEN, IOWA.

CLUTCH-CONTROL LOCK.

1,420,821.　　　　　Specification of Letters Patent.　　Patented June 27, 1922.

Application filed April 13, 1921. Serial No. 461,152.

*To all whom it may concern:*

Be it known that I, PAUL H. DASEN, a citizen of the United States, residing at Ottosen, in the county of Humboldt and State of Iowa, have invented a certain new and useful Clutch-Control Lock, of which the following is a specification.

The object of my invention is to provide a clutch control lock of simple, durable and comparatively inexpensive construction.

More particularly my invention relates to an attachment especially adapted for tractors of the Fordson or Sampson type, the device being so adapted that the clutch control lever or foot pedal may be moved to position where the parts of my device will move past center, and thus hold the clutch control pedal against its normal movement.

Still another object is to provide a clutch control lock especially adapted to be used in combination with extension steering devices so that the clutch control pedal or lever may be manipulated from a point distant from the tractor, the parts being so arranged that the lever may be moved to position where the clutch will be rendered inoperative or may be released from such position from a point distant of the tractor.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of a tractor of the Fordson type, with my improved clutch control lock shown thereon.

Figure 2 is an enlarged side elevation of my device, showing its two positions.

Figure 3 is an end elevation taken on the line 3—3 of Figure 1.

Figure 4 is a detail, side elevation of my device as attached to a tractor of the Sampson type; and Figure 5 is a detail, sectional view taken on the line 5—5 of Figure 4.

In the accompanying drawings I have used the reference numeral 10 to indicate a tractor which is provided with fenders 11. Connecting the two fenders 11 together is a fender brace 12. The brace 12 is substantially adjacent to the dash 13 of the tractor 10.

A clutch control lever or pedal 14 is provided on the tractor 10 as shown in Figures 1 and 3. My device is fixed to the clutch control lever 14 by means of a clamp device consisting of a pair of plates 15 held together by bolts 16.

A link 17 has its ends bent substantially at right angles to each other so that one end may be received below one of the plates 15 and between the bolts 16 and the other end extend upwardly from the clutch control lever 14.

The upwardly extending portion of the link 17 is provided with an opening through which is extended the bolt 18 to which is pivotally secured a lever 19.

The lever 19 is provided with an upwardly extending portion and a portion which is inclined and extending rearwardly. The ends of the lever are so arranged that the lever forms an obtuse angle.

The lever 19 is provided with a series of openings 20 to which is pivotally fixed the link 21 by means of the bolt 20 which serves as a pivot member.

Fixed to the fender brace 12 is a clamp device consisting of a pair of plates 23 held together by means of bolts 24. One of the plates 23 is provided with a portion bent at right angles to the main portion of the plate so as to provide a surface 25 which may be pivoted by means of the bolt 26 to the upper end of the link 21.

In order to prevent any sideward movement of the lever 19 and to make the entire device more efficient and endurable I provide a link 21 on each side of the lever 19 and on each side of the surface 25 of the plate 23.

In order to control the lever 19 I provide a cord 27 which is fixed in an opening in the upper end of the lever 19 and extends forwardly around a pulley wheel 28 which is fixed to an immovable part of the tractor 10. The cord 27 then extends rearwardly to a point where it may be manually moved for controlling the parts of the lever 19.

From the construction of the parts just described it will be seen that pulling the cord 27 will cause the lever 19 and the clutch control lever 14 to be moved to position as shown in the dotted lines in Figure 2 of the drawings.

When in this position the pivot member 22 of the link 21 will be moved past center or out of line with the bolt member 18 and the bolt member 26 which will then be two pivot members for the lever 19 and the links 21.

The clutch control lever 14 is normally designed to be held in its raised position, and when the clutch control lever is moved to the position shown in dotted lines in Figure 2 it is moved against the action of a yielding means which is provided within the tractor 10.

The fact that the pivot member 22 is past center causes the clutch control lever 14 to be held in its downward position, which is the inoperative position.

It will be seen that the clutch control lever 14 may be held in its inoperative position when it is desired to have the tractor remain stationary and use the ordinary drive or pulley wheel 29 of the tractor.

The clutch control lock may also be used in connection with an extension steering device so that the tractor may be stopped while the operator is sitting on a binder or some other farm implement.

In order to provide for the releasing of the clutch control lock I provide a cord 30 which extends rearwardly from the lever 19 so that by pulling the cord 30 rearwardly the lever will be permitted to move to position where the clutch control lever may be returned to normal position.

In Figures 4 and 5 of the drawings I have shown my device as attached to a tractor of the Sampson type. The plates 15 are fixed to the clutch control lever 14 in a slightly modified way. The lever 19 is fixed directly to one of the plates 15 as shown in Figure 5.

The advantages of my device are that I am able to control the clutch from a point distant of the tractor.

The parts of my device are very simple, can easily and readily be installed upon the tractor with very little effort. The opening 20 within the lever 19 permits the adjusting of the lever 19 so as to make the device operate regardless of any slight variation in the parts of the tractor.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a device of the class described adapted to be fixed to the clutch control lever of a tractor or the like comprising a clamp device fixed to the clutch control lever, a lever pivoted to said clamp device and extending upwardly and rearwardly therefrom, the upper end of said lever being provided with an opening, a link pivoted to said lever intermediate of its ends, the free end of said link being pivoted to an immovable part of the tractor, a cord fixed in the opening of said lever whereby it may be manually controlled for causing said lever to move in one direction for moving said clutch control in a direction against its normal movement for the purposes stated.

2. In a device of the class described adapted to be fixed to the clutch control lever of a tractor or the like comprising a clamp device fixed to the clutch control lever, a lever pivoted to said clamp device and extending upwardly and rearwardly therefrom, said lever being provided with a plurality of openings intermediate of its ends, a link pivotally mounted on an immovable part of the tractor, the free end of said link being selectively received in any of said openings for varying the normal position of said lever, a control cable operatively fixed to the lever whereby it may be manually controlled from a point distant from said lever for moving said lever in order to move said clutch control lever against its movement for the purposes stated.

3. In a device of the class described adapted to be fixed to the clutch control lever of a tractor or the like comprising a clamp device fixed to the clutch control lever, a lever pivoted to said clamp device and extending upwardly and rearwardly therefrom, said lever being provided with a plurality of openings intermediate of its ends, a link pivotally mounted on an immovable part of the tractor, the free end of said link being selectively received in any of said openings for varying the normal position of said lever, a control cable operatively fixed to the lever, a pulley wheel fixed to an immovable part of the tractor, said cable being extended forwardly around said pulley wheel and then rearwardly, whereby it may be manually controlled from a point distant from said lever for moving said lever in order to move said clutch control lever against its movement for the purposes stated.

4. In a device of the class described adapted to be fixed to the clutch control lever of a tractor or the like comprising a clamp device fixed to the clutch control lever, a lever pivoted to said clamp device and extending upwardly and rearwardly therefrom, the upper end of said lever being provided with an opening, a link pivoted to said lever intermediate of its ends, the free end of said link being pivoted to an immovable part of the tractor, a cord fixed in the opening of said lever whereby it may be manually controlled for causing said lever to move in one direction for moving said clutch control in a direction against its normal movement, the parts being so arranged that the device is moved past center for holding the clutch control lever against its normal movement.

5. In a device of the class described adapted to be fixed to the clutch control lever of a tractor or the like comprising a clamp device fixed to the clutch control lever, a lever pivoted to said clamp device and extending upwardly and rearwardly therefrom, the upper end of said lever being provided with an opening, a link pivoted to said lever intermediate of its ends, the free end of said link being pivoted to an immovable part of the tractor, a cord fixed in the opening of said lever whereby it may be manually controlled for causing said lever to move in one direction for moving said clutch control in a direction against its normal movement, the parts being so arranged that the device is moved past center for holding the clutch control lever against its normal movement, and a second cord for releasing said device from its past center position.

6. In a device of the class described adapted to be fixed to a clutch control lever of a tractor or the like, a lever, means for pivotally securing said lever to the clutch control lever, a link pivotally fixed to said lever and having its free end pivotally fixed to an immovable part of the tractor and a cord secured to said lever for operating it from a distance, the parts being so arranged that moving said lever in one direction will cause the parts to past center and cause the clutch control lever to be held against its normal movement.

Des Moines, Iowa, March 5th, 1921.

PAUL H. DASEN.